United States Patent [19]

Sakamoto

[11] Patent Number: 5,036,353
[45] Date of Patent: Jul. 30, 1991

[54] MAGAZINE FOR PHOTOSENSITIVE MATERIAL

[75] Inventor: Kiichiro Sakamoto, Kanagawa, Japan

[73] Assignee: Fuji Photo Film Co., Ltd., Kanagawa, Japan

[21] Appl. No.: 546,603

[22] Filed: Jun. 29, 1990

[30] Foreign Application Priority Data

Jul. 4, 1989 [JP] Japan .................................. 1-172755
Jul. 4, 1989 [JP] Japan .................................. 1-172756

[51] Int. Cl.⁵ .............................................. G03B 27/58
[52] U.S. Cl. ..................................... 355/72; 355/38; 355/68
[58] Field of Search ................ 355/38, 68, 72; 354/21

[56] References Cited

U.S. PATENT DOCUMENTS 4,588,272  5/1986  Hoda et al. ............................ 354/21
4,951,085  8/1990  Ibuchi .................................... 355/38

FOREIGN PATENT DOCUMENTS 62-106448   5/1987  Japan .
62-286040  12/1987  Japan .

OTHER PUBLICATIONS

Research Disclosure, Apr. 1980 No. 192 19223 "Photographic Film Coding".

Primary Examiner—Richard A. Wintercorn
Attorney, Agent, or Firm—Sughrue, Mion, Zinn Macpeak & Seas

[57] ABSTRACT

A photosensitive material magazine for accommodating a photosensitive material, having an information detecting unit for detecting information for setting exposure condition. The information includes at least a type of photosensitive material and set at an end of the accommodated material and in one of reader members disposed continually from the end thereof, and an output unit for detecting the detected information. The photosensitive material accommodated therein can be specified on the part of a photoprinting device, loaded with a magazine, for printing the material.

18 Claims, 10 Drawing Sheets

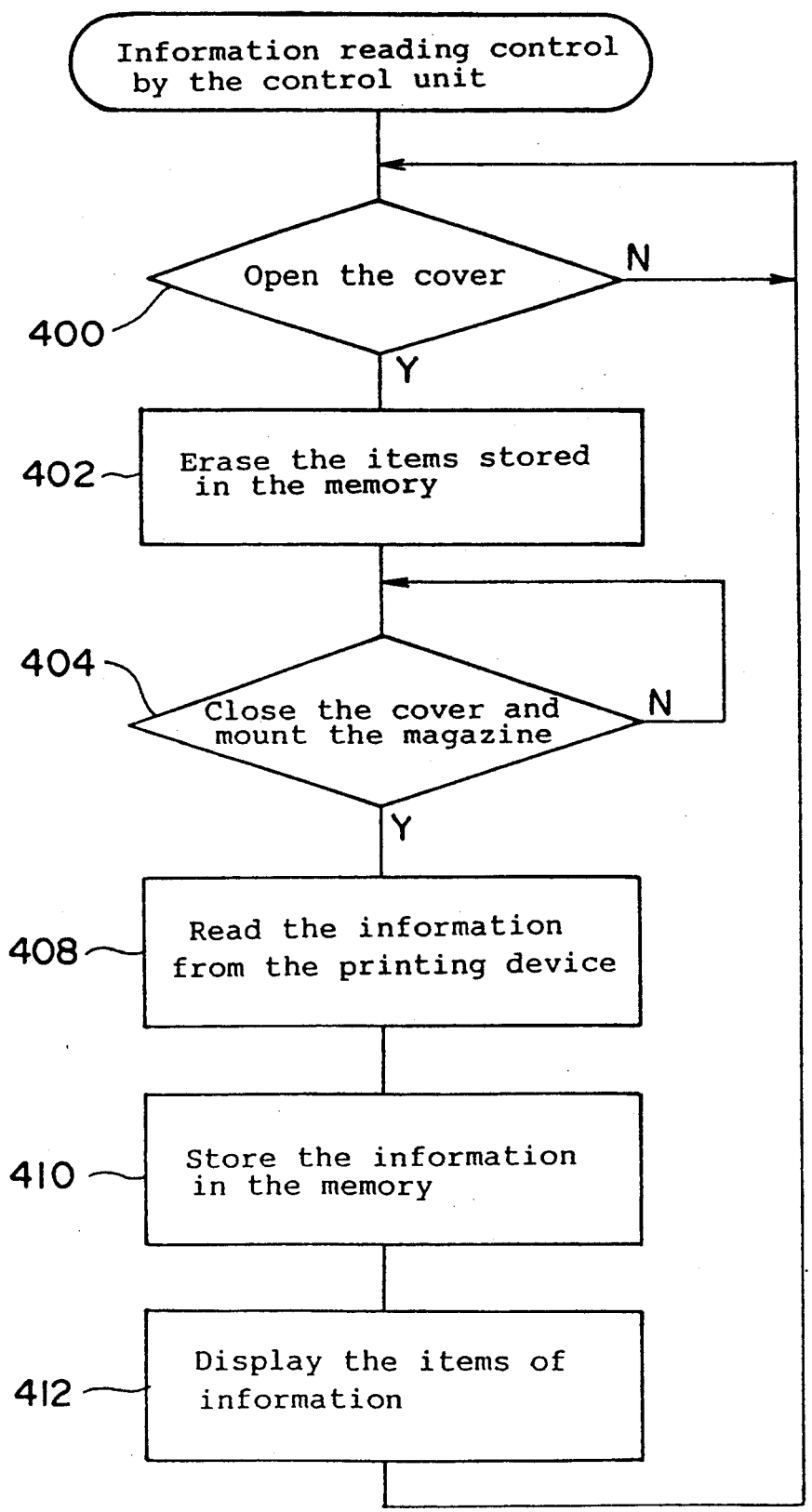

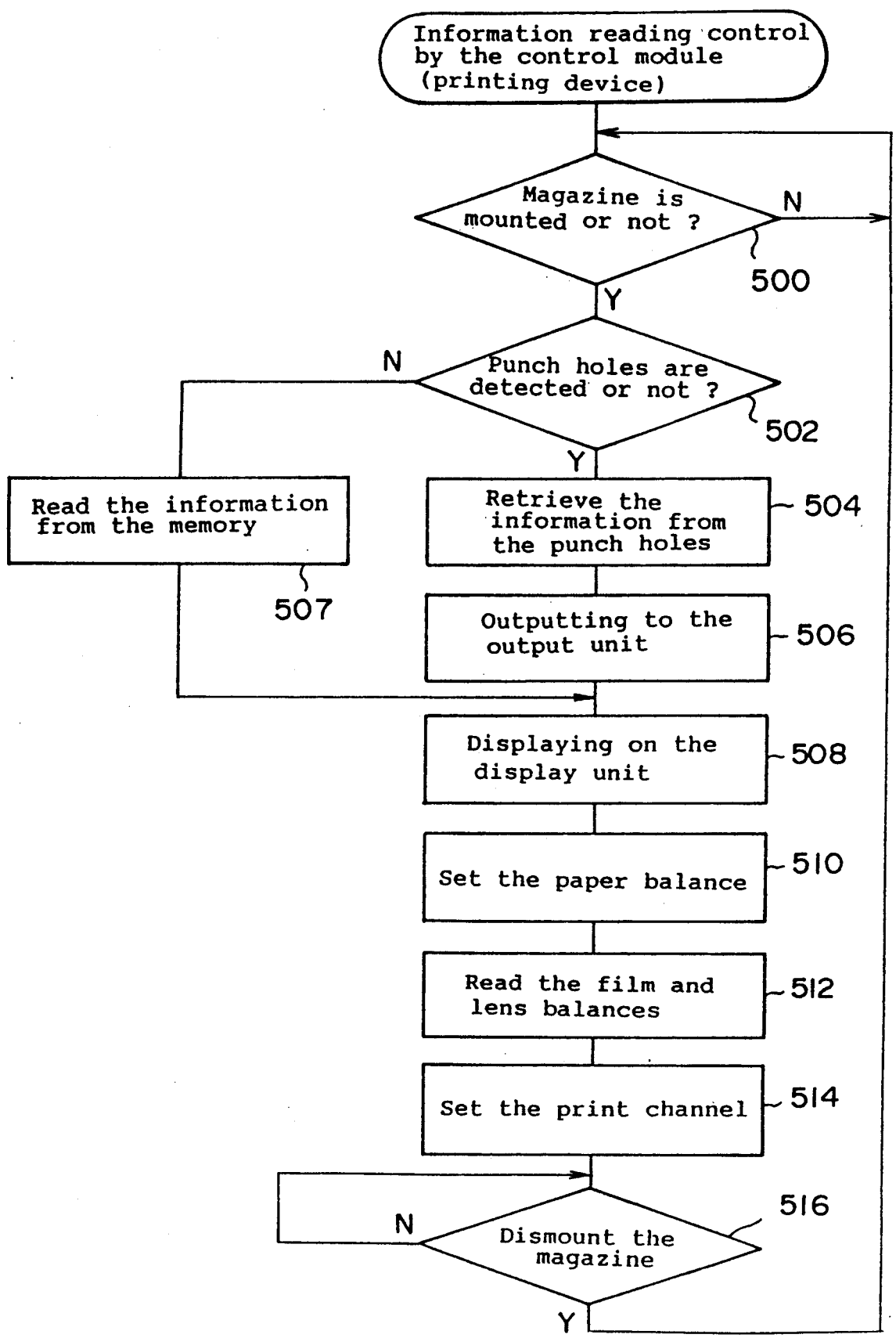

MAGAZINE FOR PHOTOSENSITIVE MATERIAL

BACKGROUND OF THE INVENTION

The present invention is related to a photosensitive material magazine for accommodating an elongated photosensitive material which has already been taken up in a layered configuration, and more, a photoprinting apparatus for printing an image on the photosensitive material after it has been drawn out of the photosensitive material magazine.

In photoprinting apparatuses is a multiplicity of print channels are prepared beforehand. The amount of exposure is controlled to finish a well-color-balanced printed photograph with an appropriate concentration by determining a coefficient or a constant by an exposure quantity arithmetic formula in accordance with the selected print channel. This print channel is determined by a combination of paper balance, lens balance and film balance. The paper balance representing a type of photographic printing paper is determined by a combination of sensitivity, type of emulsion, surface type or maker, and the manufacturer's serial number. The lens balance, indicating a type of lens is determined by a combining a printing magnification and an aperture F-value. The film balance indicates the type of photographic film, e.g., color negative film is determined by a combination of the maker, sensitivity and size.

There are, however, some problems inherent in the conventional photoprinting device, wherein paper balance is manually inputted by operating an operation panel when changing the paper magazine accommodating the printing paper. This inputting process becomes troublesome as well as sometimes causing a mistake in operation.

Under such circumstances, an apparatus was proposed (See Japanese Patent Application Laid-Open No. 62-106448) arranged such that when the paper magazine is loaded, paper balance information indicating the type of printing paper which is represented by a combination of bar codes and rugged elements at a port unit formed in the paper magazine is automatically read, and printing conditions of the printer are varied in accordance with the information. This apparatus eliminates the necessity for manual operation, and hence operability is improved.

However, a drawback to such a construction is, though there is no possibility in which the printing paper packed therein is unidentified with the representation thereof in the case of the occupied magazine being conceived as a packaging container or a dedicated magazine. The mischarging of printing paper or a failure to rewrite the representation, resulting in a mistake of indication. Consequently, the printing conditions are mistakenly set.

On the other hand, according to a known technique (RESEARCH DISCLOSURE April 1980 No. 192 19223 Photographic film coding) of specifying film characteristics such as film speed, film type, effective period, sensitivity and latitude, binary codes representing such characteristics are expressed in the form of combinations of bored and non-bored portions along edges of a 35 mm roll film between sprockets at the edges thereof. There was proposed an arrangement where the above-mentioned technique is applied to display the information on printing paper, wherein a top part of the printing paper is formed with punch marks expressed in such a format that numerals set for respective items of photosensitive property, paper quality, maker and size can be converted into electric signals; and a process optimal to the type of printing paper is effected in accordance with the data stored beforehand by automatically reading the mark (See Japanese Patent Application Laid-Open No. 62-286040). With this arrangement, the printing paper information is written on the printing paper itself. This in turn causes no mistake of indication even if reloading is effected.

Based on this construction, however, the printing paper information is be set at the top part alone. Therefore, the printing paper information can not be obtained when replacing the working magazine with another magazine filled with a different type of printing paper and reusing the printing paper which is en route for consumption, if a middle part of the printing paper turns out to be the top thereof. Hence, some device is needed to make the charged printing paper correspond to the magazine

SUMMARY OF THE INVENTION

It is a primary object of the present invention, arising out of the conditions above, to provide a photosensitive material magazine and a photoprinting apparatus capable of specifying information on photosensitive material placed in a magazine even when replacing the loaded magazine in the course of use or when refilling the photosensitive material.

To this end, according to one aspect of the invention, there is provided a photosensitive material magazine for accommodating a photosensitive material, comprising: an information detecting unit for detecting the information needed for setting exposure conditions, the information including at least the type of photosensitive material and being set at a leading end portion of the photosensitive material accommodated therein as well as in one of the reader members provided in continuation from the leading end portion thereof; and an output means for outputting an output signal corresponding to the information detected by the information detecting unit.

Based on this construction, the information on the photosensitive material is detected by the information detecting unit on a portion part of the photosensitive material magazine When the photosensitive material magazine is loaded into, e.g., a photoprinting apparatus, the information can be outputted to the photoprinting apparatus. In this manner, the information on the photosensitive material accommodated in the photosensitive material magazine can be specified on a part of the photoprinting apparatus.

In accordance with one aspect of the present invention, the output unit includes a display unit for displaying items of the information corresponding to the output signal. Hence, since the display unit is capable of displaying the items of the information corresponding to the signal outputted from the output unit, the information, i.e., properties of the photosensitive material charged in the photosensitive material magazine can be recognized.

In accordance with another aspect of the present invention, the photosensitive material magazine incorporates a memory unit for storing the information detected by the information detecting unit. The information stored in the storage unit is not varied till the photosensitive material is recharged in the photosensitive material magazine. Therefore, even when the photosen sitive material magazine, which accommodates the photosensitive material that is being used, is loaded again into the photoprinting apparatus after the photosensitive material magazine has been reloaded into the photoprinting apparatus, the information on the photosensitive material that is being used is stored in the storage unit of the photosensitive material magazine, and the information is then outputted via the output unit to the photoprinting apparatus. With this arrangement, the photoprinting apparatus is capable of setting the exposure conditions corresponding to the above-mentioned information.

In accordance with still another aspect of the invention, the photosensitive material magazine, loaded into the photoprinting apparatus, for accommodating the photosensitive material, comprises an information reading unit for reading the information needed for setting the exposure conditions, the information including at least the type of the photosensitive material and being outputted from the photoprinting apparatus, a storage unit for storing the information read by the information reading unit and an output unit for outputting the information stored in the storage unit. Based on this construction, the information outputted from the photoprinting apparatus is stored in the storage unit as well as being read by the information reading unit. The information is then outputted from the output unit. It is therefore possible to set the exposure conditions on the basis of the information of the storage unit after inputting an output from the output unit to the photoprinting apparatus loaded with the photosensitive material magazine.

In accordance with a further aspect of the invention, the photosensitive material magazine includes a display unit for displaying items of information read by the information reading unit. The display unit is capable of displaying information corresponding to a signal outputted from the output unit. It is therefore possible to facilitate recognition of the information, i.e., properties of the photosensitive material accommodated in the photosensitive material magazine.

In accordance with a still further aspect of the invention, the photosensitive material magazine has an openable/closable cover for refilling the photosensitive material. Items of information stored in the storage unit are erased upon opening the cover Hence, the stored items are held till the photosensitive material is recharged by unclosing the cover. Even when the photosensitive material magazine accommodating the photosensitive material that is being used is loaded again into the photoprinting device after the photosensitive material magazine has been reloaded into the photoprinting device, the stored items of the photosensitive material magazine are able to be utilized by the photoprinting apparatus.

The photoprinting apparatus loaded with the photosensitive material magazine for accommodating the photosensitive material according to the present invention is for printing the photosensitive material drawn out of the photosensitive material magazine. The photoprinting apparatus comprises an information detecting unit for detecting the information needed for setting the exposure conditions, the information including at least the type of photosensitive material and set at a leading end portion of the photosensitive material pulled out of the photosensitive material magazine as well as in one of the reader members provided in continuation from the top part thereof, and an output unit for outputting the output signal corresponding to the information detected by the information detecting unit. In this configuration, the photoprinting apparatus is able to utilize the information detected by the information detecting unit when setting the exposure conditions. Where the photosensitive material magazine loaded into the photoprinting apparatus has a storage unit for storing output of the output unit after receiving the output, the photosensitive material magazine is reloaded into the photoprinting apparatus. Even when the photosensitive material magazine accommodating the photosensitive material that is being employed is loaded again into the photoprinting apparatus, the stored items of the photosensitive material magazine can be utilized by the photoprinting apparatus.

As discussed above, the photosensitive material magazine and the photoprinting apparatus according to the present invention exhibit excellent advantage wherein the information pertaining to the photosensitive material charged in the magazine can be specified even when replacing the magazine in the course of use and refilling the photosensitive material.

BRIEF DESCRIPTION OF THE DRAWINGS

Other objects and advantages of the present invention will become apparent during the following discussion taken in conjunction with the accompanying drawings, in which:

FIG. 9 is a flowchart showing the information reading procedures in the control unit of the feed magazine in the second embodiment; and FIG. 10 is a flowchart showing the information reading procedures in the control unit of the photoprinting apparatus in the second embodiment.

DESCRIPTION OF THE PREFERRED EMBODIMENTS

Figure 1:
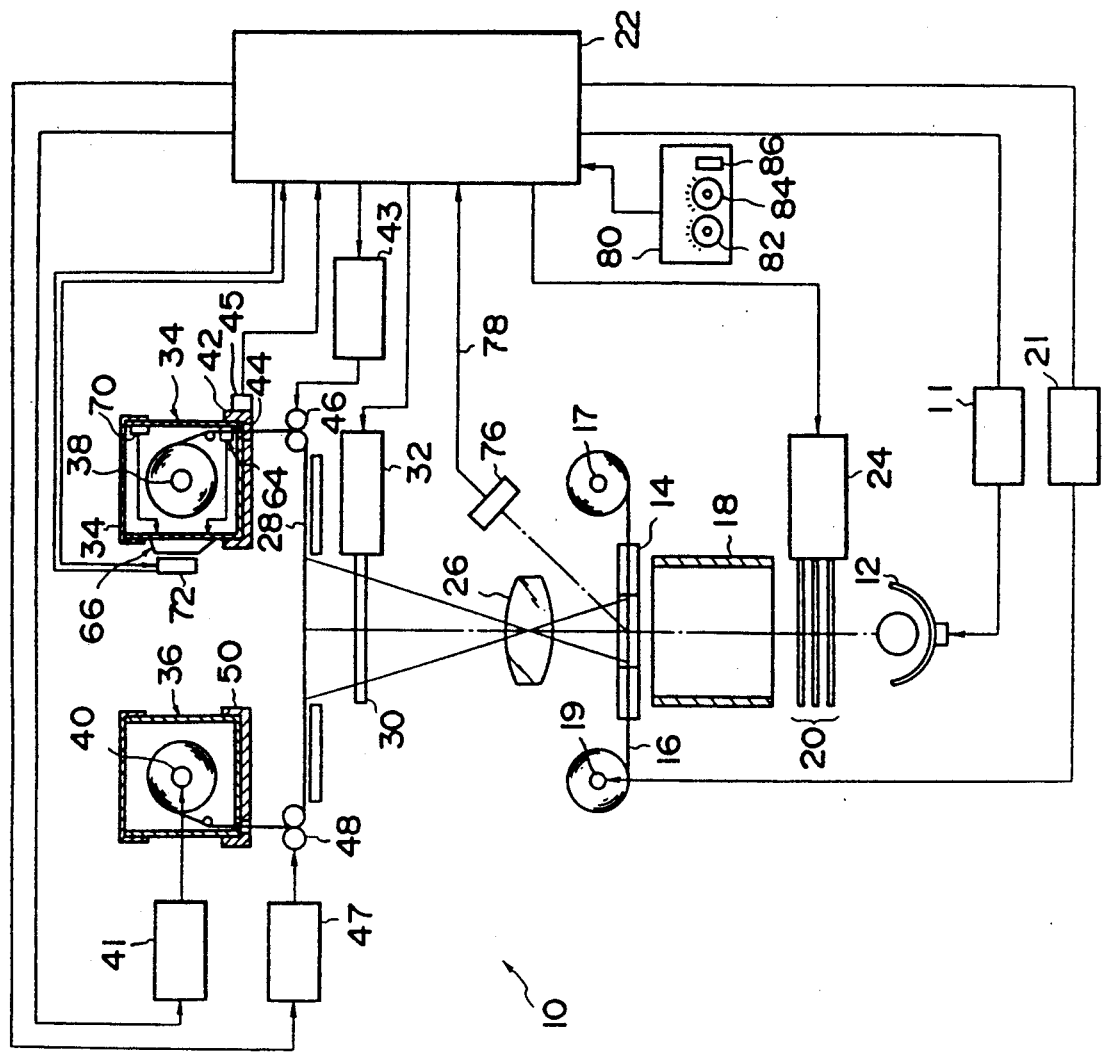
FIG. 1 is a schematic diagram illustrating a photoprinting apparatus according to the present invention.

Referring first to FIG. 1, there is illustrated a photoprinting apparatus 10 to which a photosensitive material magazine in a first embodiment of the present invention is applied.

Interposed between a white light source 12 and a negative film 16 placed in a negative film carrier 14 is a diffusion tube 18 for diffusing white light emerging from the white light source 12. Thereafter, the negative film 16 is irradiated with the thus diffused light. Disposed between the white light source 12 and the diffusion tube 18 are filters 20 which are (yellow), (magenta) and (cycan), respectively. The filters 20 are individually insertable in the optical path with the aid of a filter driving unit 24 connected to a control module 22.

The white light source 12 is connected via a driver 11 to the control module 22 from which a signal is transmitted. Light beams emitted in response to this signal are transmitted through the negative film 16 and fall on a sheet of color printing paper 28 defined as a photosensitive material after traveling through a lens 26, thereby recording an image on the negative film 16. Interposed between the lens 26 and the color printing paper 28 is a shutter 30 controlled by a shutter driving unit 32 connected to the control module 22 so as to open and close the optical path. Both longitudinal ends of the negative film 16 are wound in a layered configuration on a feed reel 17 and a take-up reel 19. The take up reel 19 is rotated by a driving force from the driver 21 driven in response to a signal transmitted from the control module 22. With this arrangement, image frames can sequentially be located in a printing position. Disposed obliquely above the printing position of the negative film 16 is a CCD sensor 76 for receiving light which has been transmitted through the negative film and thereafter performing a photoelectric conversion thereon while dividing the light into three primary colors (blue light, green light and red light). The photoelectrically-converted signal is then transmitted via a signal line 78 to the control module 22.

An operation panel 80 of the photoprinting apparatus 10 is equipped with a dial 82 for inputting a piece of film balance information indicating the type of negative film 16 and a dial 84 for inputting lens balance information representing the type of the lens 26. A specific print channel is selected among a plurality of print channels by manipulating these dials. The operation panel 80 is further provided with a print start key 86. Each print channel stores a coefficient and a constant which are employed in an exposure quantity arithmetic formula, and the coefficient and the constant which have been stored in the selected print channel are read therefrom.

In accordance with this embodiment, 4 modes of paper balance, 10 modes of film balance and 15 modes of lens balance are provided. There is additionally provided one mode of master balance determined according to each of the photoprinting devices.

Both ends of the color printing paper 28 are wound in the layered configuration around reels 38 and 40 of a supply magazine 34 and a take-up magazine 36. The color printing paper 28 which has yet to be exposed is set on a receiving tray 42 while being housed in the supply magazine 34. Attached to the receiving tray 42 is a detecting sensor 45 for detecting whether the supply magazine 34 is mounted or not, an output signal of which is supplied to the control module 22. The control module 22 determines whether the supply magazine 34 is mounted on the receiving tray 42 or not from variations in the output signal of the sensor 45. The supply magazine 34 is formed with an outlet 44 from which the end portion of the color printing paper 28 is slightly protruded. The protruded end portion is seized by a draw-out roller 46, and the color printing paper 28 is thus led to an exposure position. A feed roller 48 is disposed on a downstream side of the exposure position, the printing paper 28 is guided into the take-up magazine 36 placed on a receiving tray 50 while carrying the end portion thereof by seizure. The driving of the draw-out roller 46 and the feed roller 48 is controlled by the signals transmitted from the control module 22 via drivers 48 and 47. A reel 40 of the take-up magazine 36 is rotated by the driving force of a driver 41 connected to the control module 22, thereby consecutively taking up the exposed color printing paper 28.

Figure 2:
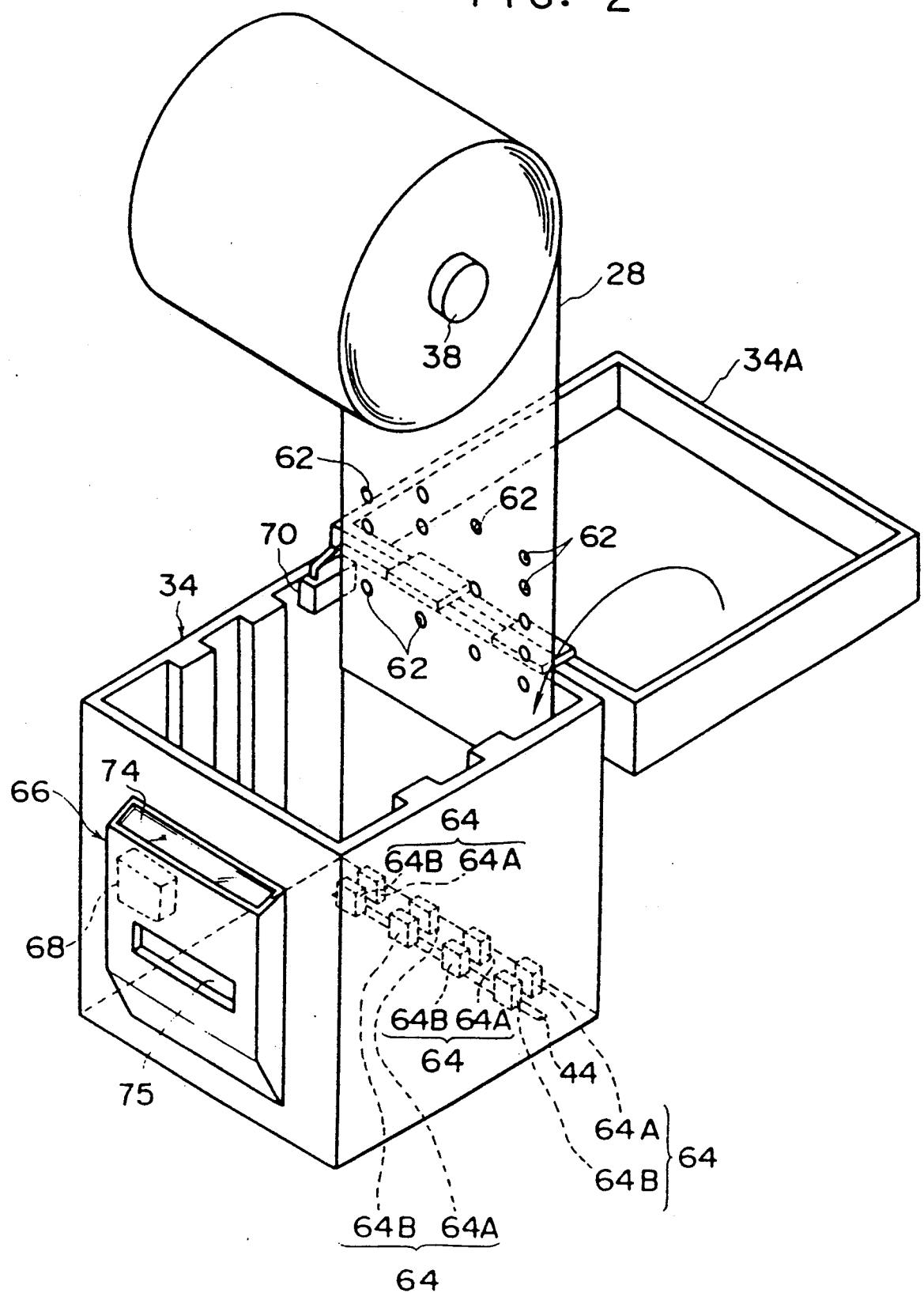
FIG. 2 is a perspective view depicting a feed magazine employed in a first embodiment.

As illustrated in FIG. 2, the end portion of the color printing paper 28 is bored with punch holes 62 indicating pieces of characteristic information on the color printing paper 28, which includes a type, size, manufacturer's serial number and the maker thereof. The punch holes 62 are arrayed in a plurality of lines in a crosswise direction of the color printing paper 28, corresponding to the type, size, serial number and maker. The punch holes 62 are also arranged so that the type, size, serial number and maker are identified by a series of numbers in the longitudinal direction.

In the supply magazine 34, light projecting members 64A and light receiving members 64B of photoelectric sensors 64 are so disposed that a passage route of the punch holes 62 is sandwiched between members 64A, 64B. The photoelectric sensors 64 are connected to a control unit 66 installed in the supply magazine 34. The control unit 66 incorporates a memory 68 for storing the number of punch holes 62 which is detected by the photoelectric sensor 64 and counted by the control unit 66 when the color printing paper 28 is carried and its leading end portion passes between the light projecting members 64A and the light receiving members 64B. The photoelectric sensors 64 are arranged to operate only during a predetermined period of time for which the end portion of the color printing paper 28 of the initially loaded supply magazine 34 passes.

In the vicinity of a cover 34A of the supply magazine 34 which is opened when refilling the color printing paper 28, there is installed an open/close detection sensor 70 for detecting the open and closed states of the cover 34A. A signal line of the sensor 70 is connected to the control unit 66. The opening/closing detection sensor 70 detects the open state of the cover 34A, at which time the items stored in the memory 68 are to be erased.

The control unit 66 is formed with a display unit 74 functioning to display the items stored in the memory 68. Provided in the control unit 66 is an information output unit 75 corresponding to a read sensor 72 connected to the control module 22 when mounting the supply magazine 34 on the receiving board 42.

The control module 22 is arranged to permit the read sensor 72 to read the information stored in the memory 68 of the control unit 66 and is capable of recognizing the characteristics of the color printing paper 28 on the basis of variations in the output signal of the detection sensor 45 when mounting the supply magazine 34 on the receiving board 42 and is capable of recognizing the characteristics of the color printing paper 28 applied.

A description of the operation in this embodiment will next be made.

In FIG. 1, the light emerging from the white light source 12 passes through the diffusion tube 18, whereby the light is diffused and led to a printing position. One frame of the negative film 16 held by the negative film carrier 14 is located in this printing position. Next, the light is transmitted through the negative film 16. The beams of transmitted light are condensed by means of a lens 26 and serve to form an image on the color printing paper 28 when opening the shutter 30 by use of the shutter driving unit 32. The respective filters 20 are inserted in the optical path by the filter driving unit 24 at the time of exposure of respective colors, and the color corresponding to the inserted filter 20 is cut.

After a predetermined exposing time has passed, the shutter driving unit 32 inserts a shutter 30 into the optical path, with the result that the optical path is shielded. Under this condition, the image recorded on the negative film 16 can be printed on the color printing paper 28.

The exposing time is calculated on the basis of image density, lens balance, film balance and paper balance. Namely, the coefficient and the constant in the arithmetic formula differ depending on the lens balance, film balance and paper balance.

The image density can be recognized by causing the CCD sensor 76 to receive the beams of light transmitted through the negative film 16. The beams of transmitted light, which have been received by the CCD sensor 76, undergo a photoelectric conversion and are then supplied to the control module 22 in which the exposing time of each color is calculated in accordance with the signal supplied. In addition, the film balance and lens balance are set on the basis of operational positions of the dials 82 and 84 provided on the operation panel 80.

Paper balance differs depending on the supply magazine 34 placed on the receiving tray 42. Procedures for setting the paper balance will be explained with reference to flowcharts of FIGS. 3 and 4.

Figure 3:
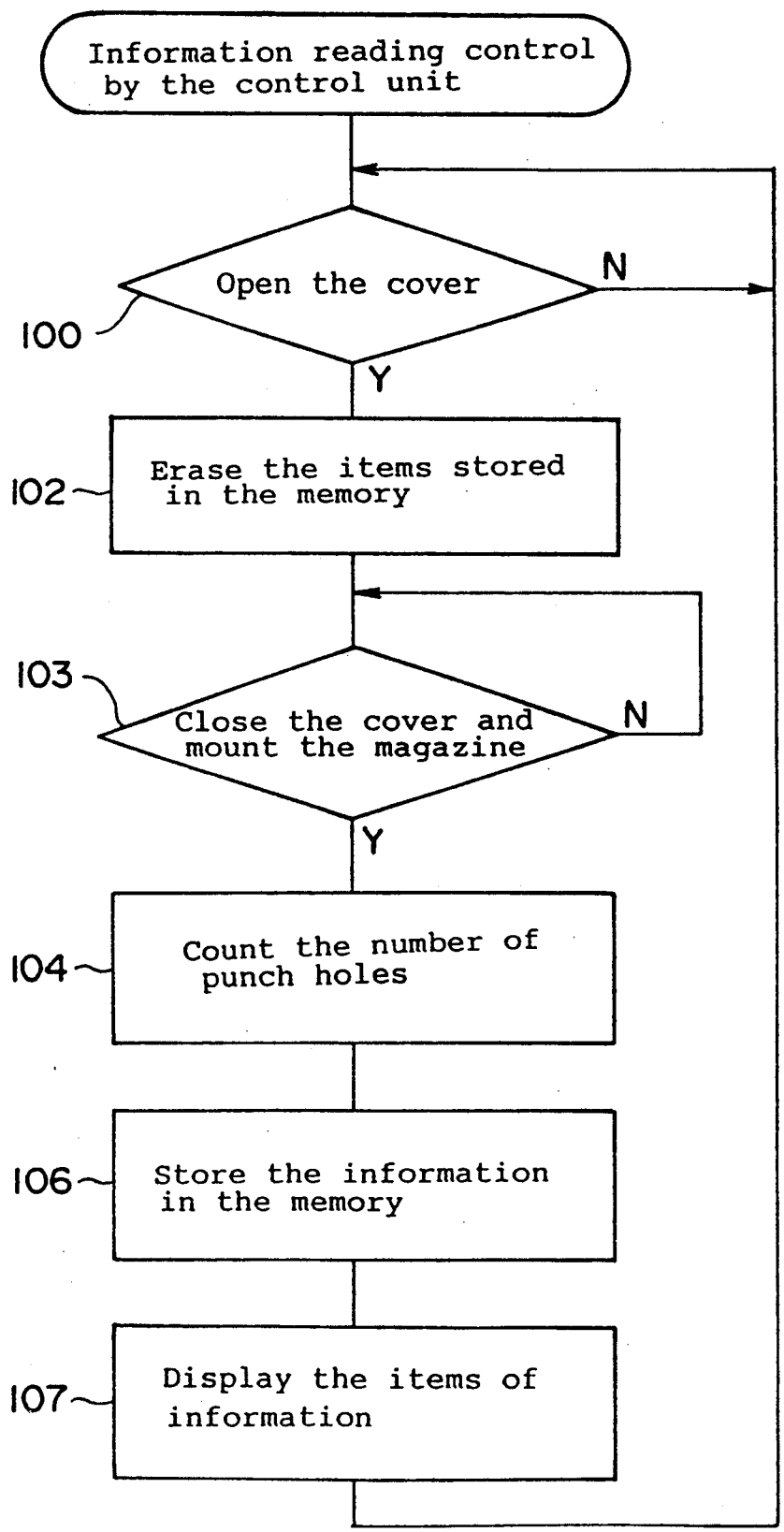
FIG. 3 is a flowchart showing information reading procedures in a control unit of the feed magazine in the first embodiment.

First, an explanation concerning the correspondence of the supply magazine 34 and the color printing paper 28 accommodated therein will be given in conjunction with FIG. 3.

The process in a step 100 is to determine whether the cover 34A of the supply magazine 34 is opened or not. If not opened, it is determined that the color printing paper 28 is not yet refilled in the supply magazine 34, and a standby status continues till an affirmative determination is made. At this time, when opening the cover 34A, the process moves from the step 100 to a step 102, wherein the information stored in the memory of the control unit 66 is cleared. Subsequently, the process shifts to a step 103. If it has been determined that the color printing paper 28 has been completely refilled in the supply magazine 34 the cover 34A has been closed and the magazine 34 has been mounted on the receiving tray 42 in the step 103, the color printing paper 28 is drawn out by the draw-out roller 46. In a step 104, the photoelectric sensor 64 detects the punch holes 62. In a subsequent step 106, the information corresponding to the number of detected punch holes 62 is read out and stored in the memory 68.

In the next step 107, the stored information is displayed on the display unit 74, thereby making it possible to specify the paper balance of the color printing paper 28 accommodated in the supply magazine 34. When the cover 34A is open the information stored in the memory 68 is canceled and rewritten into information corresponding to the color printing paper 28 refilled during a transfer of the color printing paper 28 which has been filled in the photoprinting apparatus 10. It is therefore feasible to make the stored and displayed items invariable coincide with the information on the actually accommodated color printing paper 28.

Figure 4:
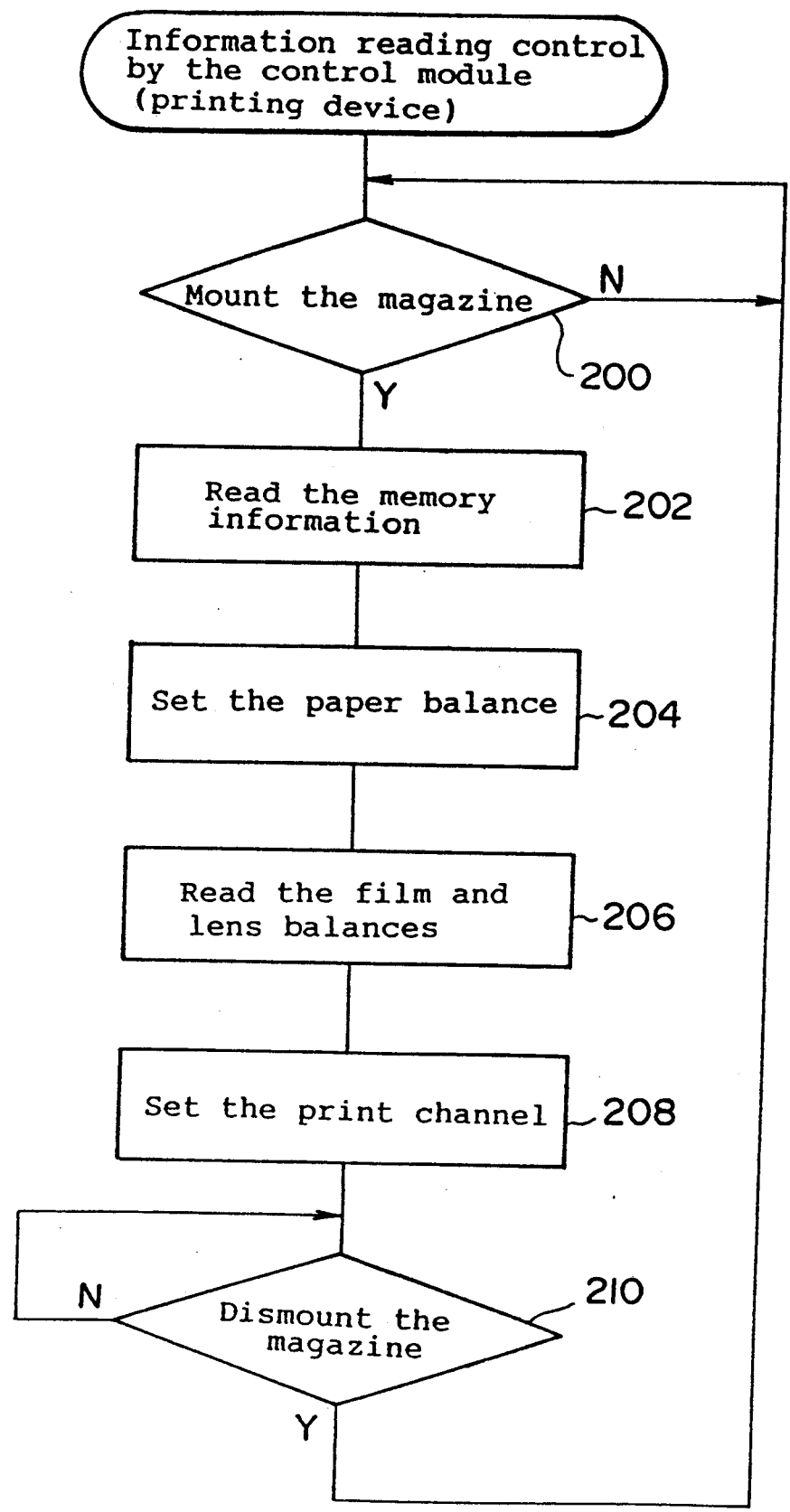
FIG. 4 is a flowchart showing the information reading procedures in a control unit of the photoprinting apparatus used in a first embodiment.

Next, a description will be made on the correspondence of the photoprinting apparatus 10 and the supply magazine 34 in conjunction with a flowchart (FIG. 4).

The operation begins is step 200 by determining from the output signal of the detection sensor 45, whether or not the supply magazine 34 is mounted on the receiving tray 42. If the fact that the supply magazine 34 is mounted on the receiving tray 42 is determined in the step 200, the process moves to a step 202. Here, the control module 22 reads the information stored in the memory 68 of the control unit 66. Subsequent to this step, the paper balance is set on the basis of the thus read information in a step 204.

In a subsequent step 206, the film balance and lens balance are read. The process then moves to a step 208 wherein a print channel is set on the basis of the film balance, lens balance and paper balance. Thereafter, the printing process continues at this print channel until the supply magazine 34 is demounted from the receiving tray 42 in the step 208.

In the supply magazine, as explained earlier, the information on the color printing paper 28 of the supply magazine 34 which remains accommodated therein till the recharging thereof is effected, and hence it is possible to read the information pertaining to the color printing paper 28 housed in the supply magazine 34 newly mounted on the receiving board 42 even when replacing the supply magazine 34. The characteristics of the accommodated color printing paper 28 are displayed on the display unit 74 of the supply magazine 34, and this arrangement facilitates a selection of the supply magazine 34 in which the color printing paper 28 exhibiting necessary properties is housed from the plurality of supply magazines 34 stocked.

On the other hand, the items stored in the memory 68 of the supply magazine 34 are cleared by opening the cover 34A, and the punch holes 62 are newly detected during a carrying process after the mounting on the next photoprinting apparatus 10 has been executed to thereby stored the information. As a result, there is no probability that misinformation is stored therein.

Note that in this embodiment the color printing paper 28 is pierced with the punch holes 62 the number of which is read by the photoelectric sensor 64 but may be read by a mechanical sensor like a counter. Besides, the marks corresponding to pieces of information may involve the use of bar codes or rugged elements. In the case of the bar codes, a bar code reader is installed in place of the photoelectric sensor 64. Whereas in the case of the rugged elements, a limit switch is provided to detect the respective marks.

Figure 6:
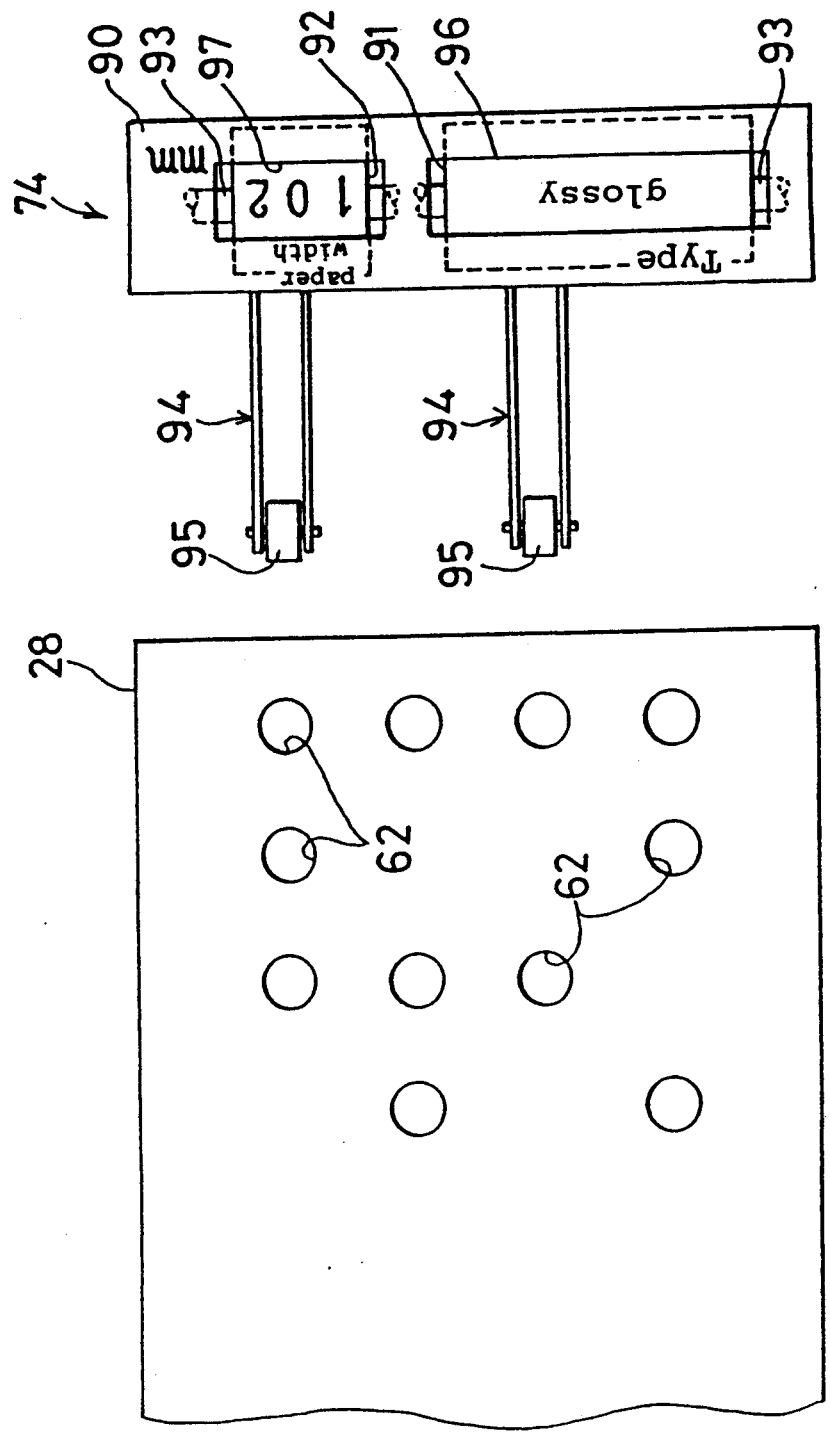
FIG. 6 is a plan view illustrating a mechanism display unit.

A display mode of the display unit 74 includes electric display modes such as an LCD display mode and an LED display mode. Furthermore, as illustrated in FIG. 6, a mechanical display mode may be applied. More specifically, referring again to FIG. 6, the display unit 74 is constructed in such a way that a casing 90 encases two drum-like rotary displays 91 and 92 which are axially supported via a shaft 93 in the casing 90. The type of color printing paper 28 in the supply magazine 34 is displayed beforehand on the peripheral surface. The color printing paper 28 may take a variety of forms—i.e., gloss, silk, luster, mat, metallic and crystal. On the other hand, the rotary display 92 includes its peripheral surface on which a plurality of paper width dimensions of the color printing paper 28 in the supply magazine 34 are displayed. Note that the width dimension of the color printing paper 28 is set at 102 mm, 117 mm and 127 mm.

The rotary displays 91 and 92 are rotated about the shaft 93, corresponding to the number of oscillations of a lever 94. To be specific, each of the rotary displays 91 and 92 is turned by a predetermined amount when making one oscillation of the lever 94 and hence makes one rotation in proportion to multiples of the number of oscillations thereof. A tip of the lever 94 is fitted with a roller 95 which is normally disposed along the carrier route for the color printing paper 28. For this reason, the lever 94 operates according to the presence or non-presence of punch holes 62 bored in the end portion of the color printing paper 28. Based on the number of operations, the rotary displays 91 and 92 make predetermined amounts of rotations. Subsequently, the type of paper and the paper width dimension which correspond to the number of punch holes and the paper width dimensions are indicated in corresponding positions on an upper surface of the casing 90. The upper surface of the casing 90 is pierced with rectangular holes 96 and 97 corresponding to the rotary displays 91 and 92, whereby corresponding representations are visually observed on the upper surface of the casing 90.

After the end portion of the color printing paper 28 has passed, the lever 94 retreats from the carrier route from the color printing paper 28. It is to be noted that the retreating is not required if an operating force of the lever 94 is weakened but not enough to deface the color printing paper 28 on the occasion of contact therewith.

Figure 5:
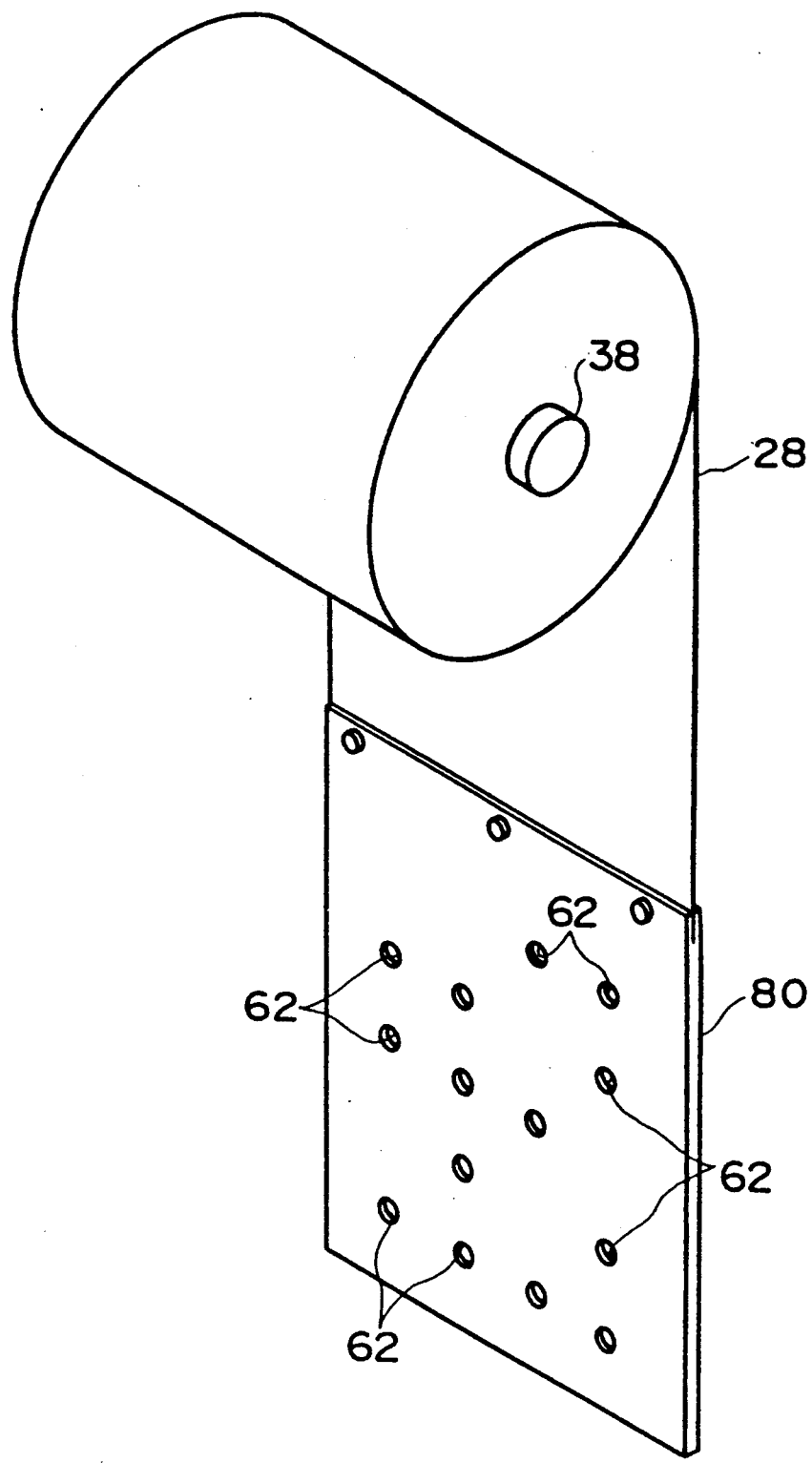
FIG. 5 is a perspective view depicting a configuration where a reader is attached to a top part of color printing paper.

In accordance with this embodiment, the punch holes 62 are perforated in the end portion of the color printing paper 28. As depicted in FIG. 5, however, the end portion of the color printing paper 28 is fitted with a reader 80 in which the punch holes 62 may be pierced. In this case, a practicable arrangement is that only the reader 80 is dismounted therefrom to make the same information reapplicable to the color printing paper 28 and to eliminate the necessity for forming the punch holes 62 in the whole color printing paper 28.

A second embodiment will next be described.

Figure 7:
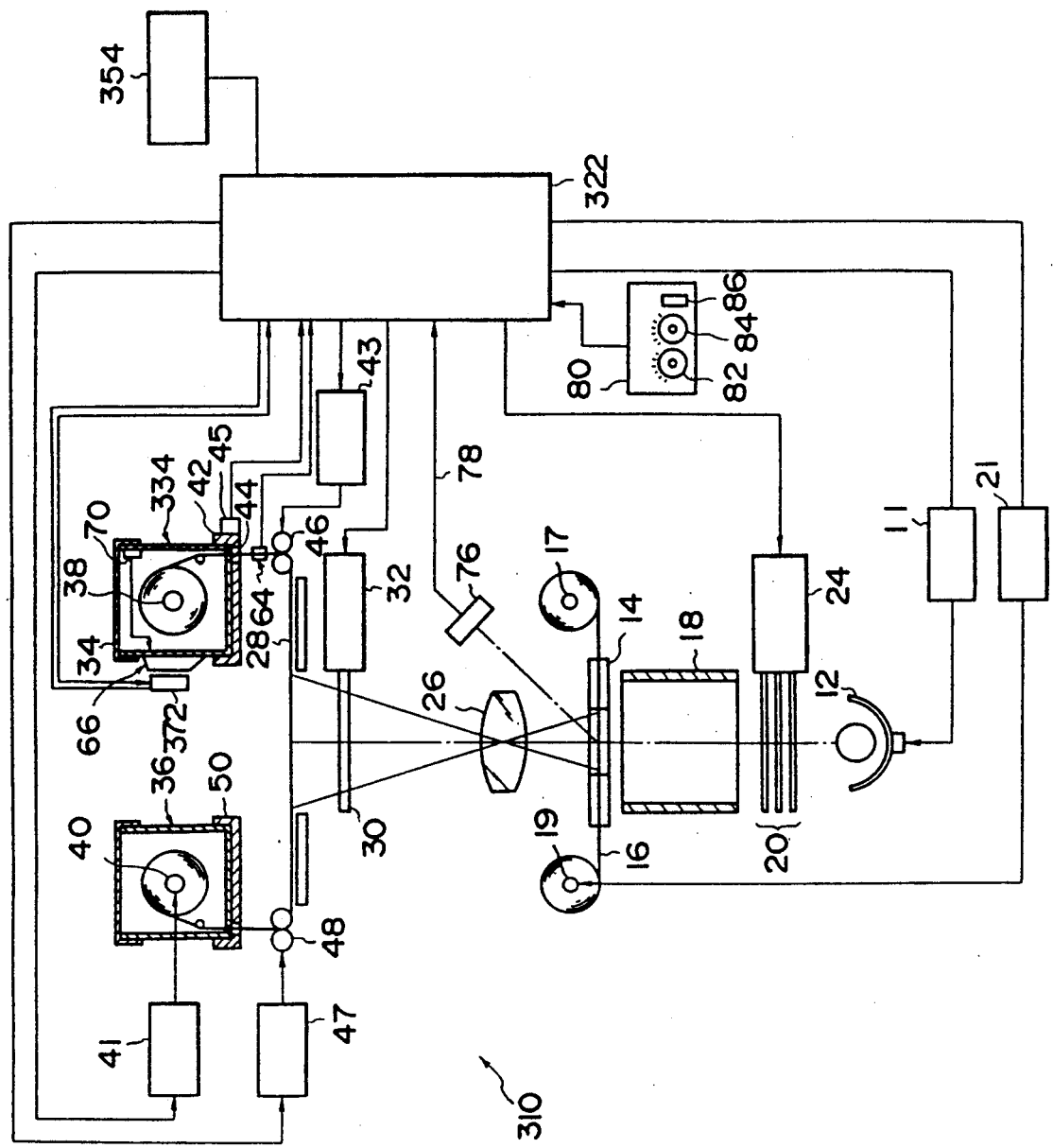
FIG. 7 is a schematic diagram depicting the photoprinting apparatus in a second embodiment.

FIG. 7, depicts a photoprinting apparatus 310 to which a photosensitive material magazine used in the second embodiment is applied.

In the explanation of the second embodiment, the same members and components as those of the first embodiment are marked with symbols identical to those employed in the first embodiment, and the description thereof is omitted herein.

Figure 8:
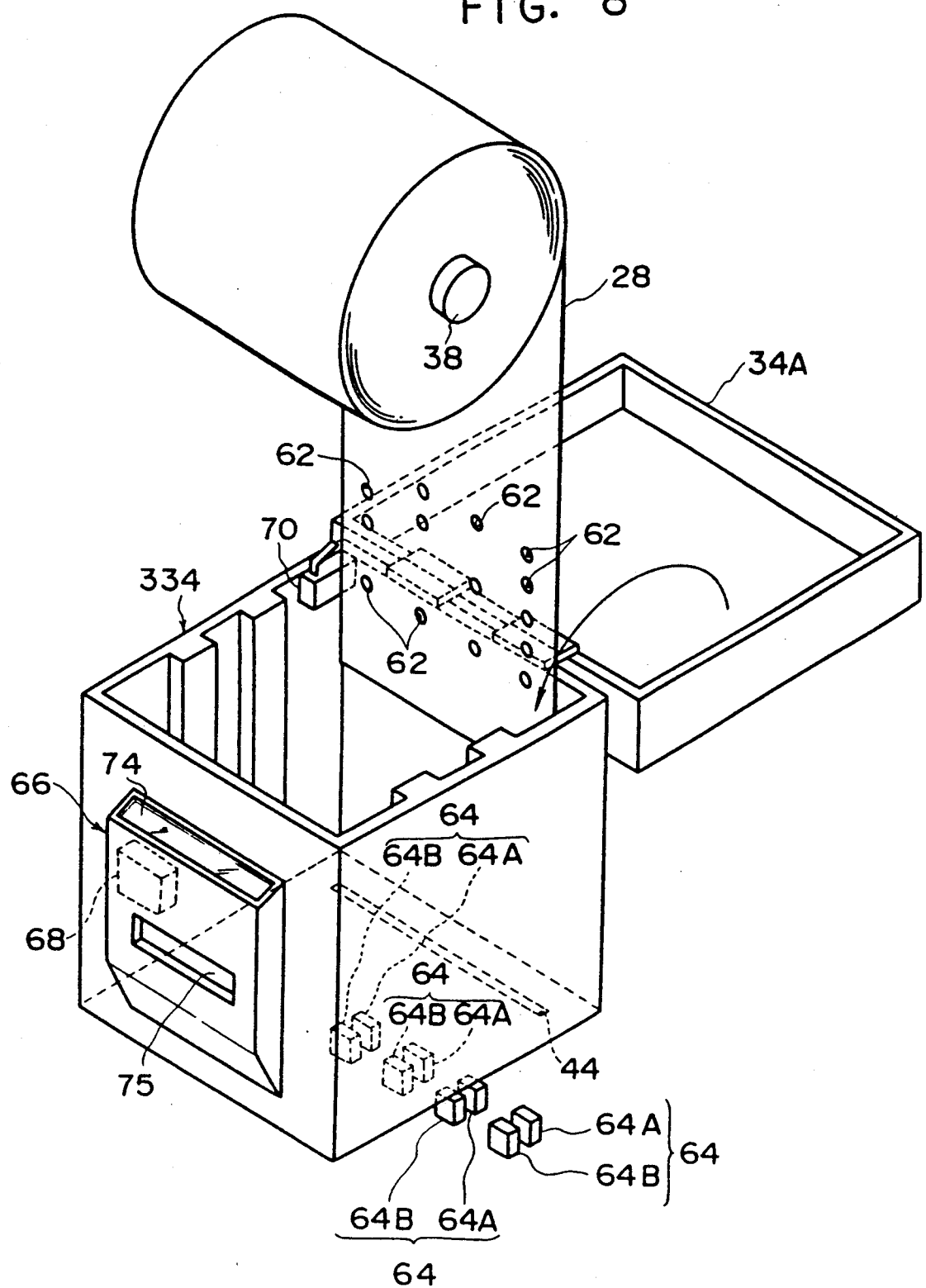
FIG. 8 is a perspective view illustrating the feed magazine in a second embodiment.

A big difference between the first and second embodiments is that the photoelectric sensor 64 is disposed not in the supply magazine 34 but in the photoprinting apparatus 310. More specifically, the light projecting members 64A and the light receiving members 64B of the photoelectric sensors 64 are disposed, as viewed in the FIG. 7, below the receiving tray 42 mounted with a supply magazine 334 in such a manner that, as is also illustrated in FIG. 8, the carrier route of the punch holes 62 formed in the end portion of the color printing paper 28 is sandwiched between the above-mentioned members 64A and 64B. The photoelectric sensors 64 are, as in the first embodiment, connected to a control module 322. Therefore, when the end portion of the color printing paper 28 passes through gaps between the light projecting members 64A and the light receiving members 64B after the paper 28 has been carried, the punch holes 62 are detected by the photoelectric sensors 64, and the control module 322 serves to count and store the number of the punch holes 62. The photoelectric sensor 64 is arranged to operate only during a predetermined period of time for which the end portion of the color printing paper 28 passes when mounting the supply magazine 34 on the receiving tray 42.

Connected to the control module 322 is an information I/O unit 372 located corresponding to an information I/O unit 75 of the control unit 66 placed on the receiving tray 42.

Also, connected to the control module 322 is a display unit 354 for displaying information, when the information on the color printing paper 28 is obtained after detecting the punch holes 62 and then outputted from the information I/O unit 372 to the information I/O unit 75 of the control unit 66. The information I/O unit 75 of the control unit 66 functions to read the information outputted from the information I/O unit 372 and permits the memory 68 to store the information. Hence, the control module 322 permits the information I/O unit 372 to read the information stored in the memory 68 of the control unit 66, if no punch hole 62 is detected by the photoelectric sensors 64—viz., the end portion of the color printing paper 28 has already been used, and the supply magazine 34 has been placed on the receiving tray 42, thus recognizing the characteristics of the color printing pape 28 to be applied.

A description of the operation of the second embodiment will now be given.

The paper balance differs depending on the supply magazine 34 mounted in the receiving tray 42. An explanation will be given of procedures of setting the paper balance with reference to flow charts of FIGS. 9 and 10.

First, a correspondence between the supply magazine 334 and the color printing paper 28 accommodated therein will hereinafter be described referring to FIG. 9.

In a step 400, whether or not the cover 34A of the supply magazine 334 is open is determined. If the cover 34A is determined open, the process moves from the step 400 to step 402, wherein the information stored in the memory 68 of the control unit 66 is cleared. Subsequently in a step 404, the cover 34A is closed. If it is determined that the supply magazine 334 has been placed on the receiving board 43, the process shifts to a step 408 wherein a signal outputted from the information I/O unit 372 of a photoprinting device 310 is read by the information I/O unit 75 of the supply magazine 334. Outputted from the information I/O unit 372 is information set in accordance with the punch holes 62 and detected after mounting the supply magazine 334 on the receiving tray 42, which will be described later.

In the next step 410, the thus read information is stored in the memory 68. Thereafter the process moves to a step 412, wherein the information stored in the memory 68 is displayed on the display unit 74. With this arrangement, the paper balance of the color printing paper 28 in the supply magazine 334 can be specified. When opening the cover 34A, the information stored in the memory 68 is canceled and rewritten as information corresponding to the color printing paper 28 refilling during a transfer of the color printing paper 28 after being loaded in the photoprinting apparatus 310, thereby making the stored and displayed items invariably coincident with the information on the actually housed color printing paper 28.

Next, a description will be given of a correspondence been the supply magazine 334 and the photoprinting device 310 in the control module 322 incorporated into the photoprinting apparatus 310 in conjunction with a flowchart of FIG. 10.

In a step 500, a determination is made on the basis of variations in the detection signal of the detection sensor 45, as to whether or not the supply magazine 334 is placed on the receiving tray 42. If the supply magazine 334 has been determined to be mounted on the receiving tray 42, the process moves to a step 502. In the step 502, whether or not the punch holes 62 are detected by the photoelectric sensor 64 is determined. At this moment, if detected, the process shifts to a step 504 in which to retrieve the information on the color printing paper 28 on the basis of the detected punch holes 62. After outputting a signal corresponding to the information retrieved to the information I/O unit 372 (a step 506), the process proceeds to a step 508.

If no punch hole 62 is detected in the step 502, this implies that the end portion of the color printing paper 28 has already been employed, and the color printing paper 28 is the one which is being used. Then, the information stored in the memory 68 is read by the information I/O unit 372 from the information I/O unit 75 of the control unit 66 in a step 507. Subsequently, the process moves to a step 508 wherein the information read in the photoprinting apparatus 310 is displayed on the display unit 354. The operation then goes to step 510.

In the step 510, the paper balance is set in accordance with the information read, and subsequently in a step 512 the film balance and lens balance are read out.

In the next step 514, a print channel is set from the film balance, lens balance and paper balance. Thereafter, the printing process continues at this print channel till the supply magazine 334 is demounted from the receiving board 42 in a step 516.

As discussed above, the supply magazine 334 is constructed such that information about the color printing paper 28 accommodated therein remains stored till the color printing paper 28 is refilled. Consequently, after the single supply magazine 34 has been replaced with another supply magazine 334, even while being refilled in the photoprinting apparatus 310, the information pertaining to the color printing paper 28 set in the supply magazine 334 concerned is readable. In addition, the supply magazine 334 is constructed to cause its display unit 74 to display the properties of the color printing paper 28 housed therein. It is therefore possible to facilitate the selection of a supply magazine 334 which accommodates the color printing paper 28 exhibiting necessary properties among the plurality of stocked supply magazines.

On the other hand, the items stored in the memory 68 of the supply magazine 334 are cleared on opening the cover 34A. The punch holes 62 are newly detected by the photoprinting apparatus 310 during the transfer of the color printing paper 28 after being charged next in the photoprinting apparatus 310, and the information thereof is read and stored. At the same time, if the end portion of the color printing paper 28 has already been employed, the information stored in the memory 68 is reversely outputted from the supply magazine 334 to the photoprinting apparatus 310. Hence it is feasible to make the information on the part of the photoprinting device 310 invariably coincident with the information on the color printing paper 28 in the supply magazine 334.

Although the illustrative embodiments have been described in detail with reference to the accompanying drawings, it is to be understood that the present invention is not limited to those precise embodiments. Various changes or modifications may be effected therein by one skilled in the art without departing from the scope or spirit of the invention.

What is claimed is:

1. A photosensitive material magazine for accommodating a photosensitive material, said magazine comprising:

an information detecting means for detecting information needed for setting exposure conditions which includes at least a type of said photosensitive material, said information being set in a leading end portion of said photosensitive material accommodated therein as well as in one reader member provided in continuation from said leading end portion thereof; and an output means for outputting an output signal corresponding to said information detected by said information detecting means, wherein said output means incorporates a display means for displaying items of said information corresponding to said output signal, and said display means includes a display unit visible from an outside surface of said photosensitive material magazine.

2. A photosensitive material magazine according to claim 1, further comprising a storage means for storing said information detected by said information detecting means.

3. A photosensitive material magazine according to claim 2, wherein said storage means is constructed so that the items stored therein so not vary until said photosensitive material is refilled in said photosensitive material magazine.

4. A photosensitive material magazine according to claim 2, further comprising an openable/closable cover applied to refilling of said photosensitive material, the opening of said cover causing the items stored said storage means to be erased.

5. A photosensitive material magazine according to in claim 4, further comprising an open/close sensor for detecting whether said cover opens or closes, said sensor transmitting a detection signal indicating the opening of said cover, on which the erasure of items stored in said storage means is based.

6. A photosensitive material magazine according to claim 5, wherein said information detecting means is composed of photoelectric sensors each having a light projecting member and a light receiving member which are disposed so that passage route for said photosensitive material is sandwiched in therebetween.

7. A photosensitive material magazine according to claim 1, wherein said display means consists of a means for electrically displaying the information.

8. A photosensitive material magazine according to claim 1, wherein said display means consists of a means for mechanically displaying the information.

9. A photosensitive material magazine, loaded in a photoprinting device, for accommodating a photosensitive material, said magazine comprising:

an information reading means for reading information needed for setting exposure conditions, said information including at least a type of said photosensitive material and being outputted from said photoprinting device;

a storage means for storing said information read by said information reading means; and an output means for outputting said information stored in said storage means;

further comprising a display means for displaying items of said information read by said information reading means, said display means including a display unit visible from an outside surface of said photosensitive material magazine.

10. A photosensitive material magazine according to claim 9, said display means being disposed in said information reading means.

11. A photosensitive material magazine according to claim 10, wherein said storage means is constructed so that the items stored therein do not vary until said photosensitive material is recharged in said photosensitive material magazine concerned.

12. A photosensitive material magazine according to claim 10, further comprising an openable/closable cover applied to refilling of said photosensitive material, said cover being opened to erase the items stored in said storage means.

13. A photosensitive material magazine according to claim 12, further comprising an opening/closing sensor for detecting whatever or not said cover opens or closes, said opening/closing sensor transmitting a detection signal indicating the opening of said cover, on which the erasure of the items stored in said storage means is based.

14. A photoprinting apparatus, into which a photosensitive material magazine for accommodating a photosensitive material is loaded, for printing an image recorded on a negative film on said photosensitive material drawn out of said photosensitive material magazine, said apparatus comprising:
    an information detecting means for detecting information needed for setting exposure conditions which includes at least a type of said photosensitive material, said information being set in a leading end portion of said photosensitive material pulled out of said photosensitive material magazine as well as in one reader member provided in continuation from the leading end portion thereof; and
    an output means for outputting an output signal corresponding to said information detected by said information detecting means.

15. A photoprinting apparatus according to claim 14, further comprising a control module constructed to store said information detected by said information detecting means, set said exposure conditions on the basis of said stored information and output said output signal by said output means.

16. A photoprinting apparatus according to claim 15, wherein said control module includes a display means for displaying items of information corresponding to said stored information.

17. A photoprinting apparatus according to claim 16, wherein said information detecting means is composed of photoelectric sensors each having a light projecting member and a light receiving member which are disposed so that a passage route for said photosensitive material is sandwiched therebetween.

18. A photosensitive material magazine for accommodating a photosensitive material, said magazine comprising:
    an information detecting means for detecting information needed for setting exposure conditions which includes at least a type of said photosensitive material, said information being set in a leading end portion of said photosensitive material accommodated therein as well as in one reader member provided in continuation from said leading end portion thereof; and
    an output means for outputting an output signal corresponding to said information detected by said information detecting means, wherein said output means incorporates a display means for displaying items of said information corresponding to said output signal;
    further comprising a storage means for storing said information detected by said information detecting means, wherein said storage means is constructed so that the items stored therein do not vary until said photosensitive material is refilled in said photosensitive material magazine.

* * * * *